(12) United States Patent
Yang

(10) Patent No.: US 6,788,675 B1
(45) Date of Patent: Sep. 7, 2004

(54) METHOD AND APPARATUS FOR TELECOMMUNICATIONS USING INTERNET PROTOCOL

(75) Inventor: Jin Yang, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/979,812

(22) Filed: Nov. 14, 2001

(30) Foreign Application Priority Data

May 25, 1999 (EP) .............................. 99304034

(51) Int. Cl.[7] .............................. H04L 12/66
(52) U.S. Cl. .............. 370/352; 370/395.5; 370/521
(58) Field of Search .................. 370/352, 353, 370/354, 355, 356, 392, 395.1, 395.5, 395.52, 401, 320, 335, 465, 469, 477, 521

(56) References Cited

U.S. PATENT DOCUMENTS

| | | | |
|---|---|---|---|
| 5,841,854 A | | 11/1998 | Schumacher et al. |
| 5,910,946 A | * | 6/1999 | Csapo ..................... 370/328 |
| 5,953,322 A | * | 9/1999 | Kimball .................. 370/328 |
| 6,032,197 A | * | 2/2000 | Birdwell et al. ......... 709/247 |
| 6,064,653 A | * | 5/2000 | Farris ..................... 370/237 |
| 6,259,691 B1 | * | 7/2001 | Naudus .................... 370/352 |
| 6,314,095 B1 | * | 11/2001 | Loa ........................ 370/352 |

FOREIGN PATENT DOCUMENTS

| | | | |
|---|---|---|---|
| EP | 0 820 168 A2 | 1/1998 | ............. H04L/5/14 |
| EP | 0 841 831 A2 | 5/1998 | ............. H04Q/11/04 |
| EP | 0 917 328 A2 | 10/1998 | ............. H04L/29/06 |
| WO | WO 98/37665 | 8/1998 | ............. H04L/12/28 |
| WO | WO 00/72549 A3 | 11/2000 | ............. H04L/29/06 |

OTHER PUBLICATIONS

S. Casner, V. Jacobson: "Compressing IP/UDP/RTP Headers for Low–Speed Serial Links," Network Working Group, Feb. 1999, pp. 1–22, XP002121319 cited in the application the whole document. (Relevant to claim No. 17–21.).

Compressing IP/UDP/RTP Headers for Low Speed Serial Links by S. Casner 02/99.

Voice Data, Need for Standards by S. Pai.

* cited by examiner

Primary Examiner—Frank Duong

(57) ABSTRACT

In a wireless packet switching telecommunications network, voice services are provided by having a compressor/decompressor in each mobile station to provide each voice packet with a compressed header. Voice data and signalling data are sent separately and in different data formats to the air interface. The compressed header may be an M bit and a cyclically reset timeclick_number, which is decompressed by use of a wallclock which counts reset cycles to reinstate the voice packet headers. Alternatively, RTP agents are provided at the compression and decompression points, and voice packets are sent without headers over a "high quality" network such as a frame relay or ATM network. Compression state of a voice packet header can be established by sending call set-up information over an out-of-band channel between compression points in a mobile station and in die network.

8 Claims, 6 Drawing Sheets

Compression accessed by APPS

Compression accessed by IP

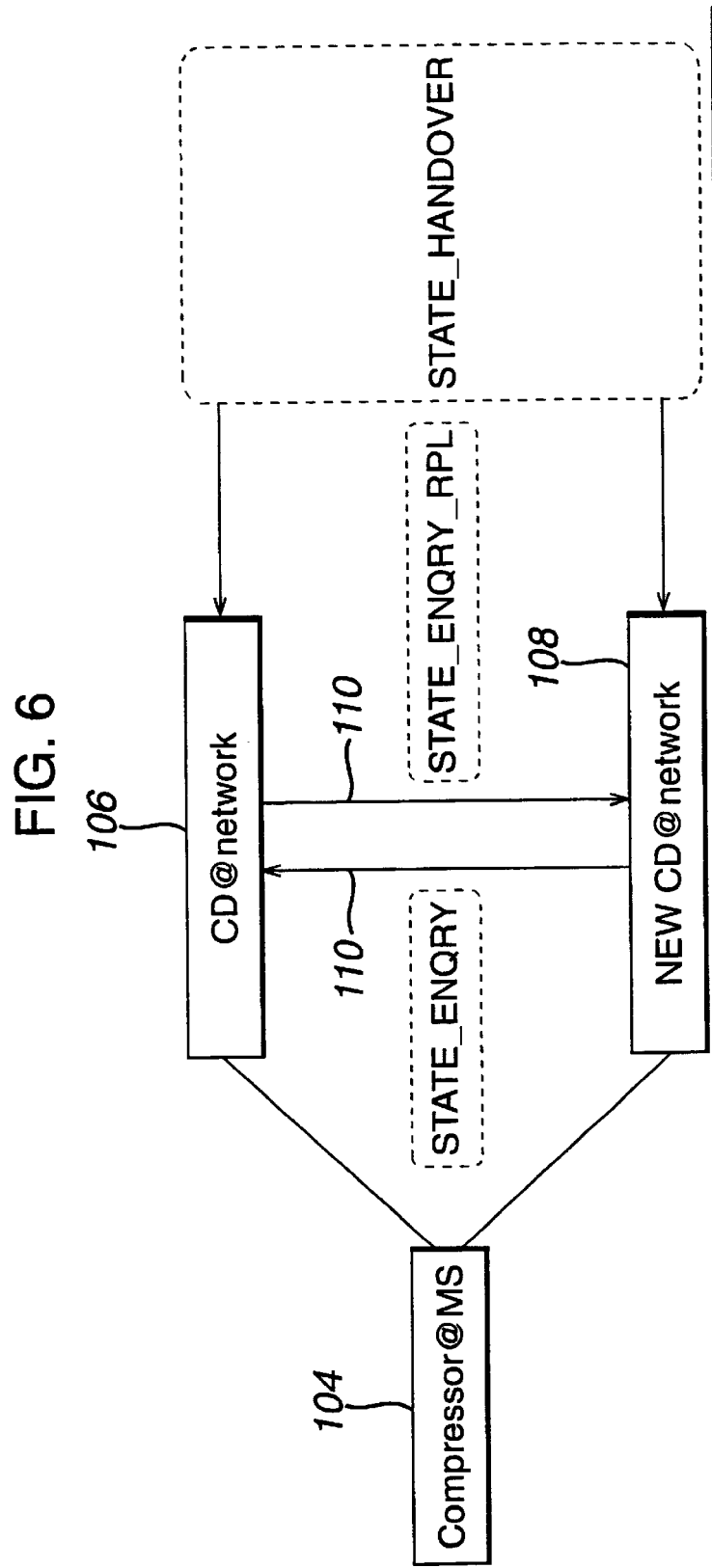

METHOD AND APPARATUS FOR TELECOMMUNICATIONS USING INTERNET PROTOCOL

ABBREVIATIONS

The following abbreviations are frequently used in the draft:
PSNT: Public Switched Telephone Network
TCP: Transport Control Portocol
UDP: User Datagram Portocol
RTP: Real Time Portocol
IP: Internet Portocol
VoIP: Voice Over IP
CD: compressor/de-compressor
CDMA: Code Division Multiplexing Access
MAC: Medium Access Control
RLC: Radio Link Control
GSM: Global System for Mobile communications
GPRS: General Packet Radio Service

1. Field of the Invention

This invention relates to an apparatus and method for telecommunications using Internet Protocol, and relates especially to an advantageous data compression arrangement.

In a wireless telecommunications network operating a packet switching technology, it would advantageous to be able to offer voice and data services using the Internet, but the need to transmit the combined headers of Real-time Transport Protocol (RTP), User Datagram Protocol (UDP) and Internet Protocol (IP) in each packet header is a disadvantage. The three headers are respectively 20, 8 and 12 bytes per packet, and this 40 byte load is nearly double the voice payload of 23 bytes for 20 milliseconds in the voice coding system known as GSM FR. It is well known that wireless resource/bandwidth is more expensive than landline arrangements, and the overload of the large header load is a serious drawback.

2. Brief Description of the Prior Art

One solution as disclosed by S Casner and V Jacobson. "Compressing IP/UDP/RTP Headers for Low-Speed Serial Links", RFC2508, ftp://ftp.isi.edu/innotes/rfc2508.txt is to compress the RTP/UDP/IP headers. A protocol is defined to compress and decompress the headers, and a reduction to between 2 and 5 bytes can be achieved. However, a major disadvantage is that if a compressed packet is lost it must be re-transmitted and the provision of an error-recovery facility is essential, and therefore the round-trip-time must be short if quality is to be maintained. Further, for many radio networks in which the radio bearer capacity is designed for circuit voice service so the link layer PDU size is designed to match voice payload, it is difficult to put even 2–5 more bytes into one Medium Access Control (MAC) block, so that one voice frame with its compressed header may have to be transmitted in two MAC blocks, requiring extra radio resource or there may be loss of voice quality; yet again, handover may change the compression/decompression point in the network, requiring the compression state to be re-established, which needs a CONTEXT_STATE message then a FULL_HEADER packet to be sent, which causes delay and packet loss.

In S Petrack, Ed Ellesson, Framedwork for Compressed RTP, Preliminary IETF draft, presented on rem-con mailing list. Feb. 1996, http://www.mbonecom/lists/rem-conf.1996Q1/0259.html, it is suggested that the two time related fields (RTP sequence number and timestamp) can be compressed using a 1-byte "timeclick" number and a separate RTP session control is suggested to signal the static parts of the headers out of band, but no details are given of how to achieve this.

SUMMARY OF THE INVENTION

According to the invention, a mobile station for a packet switching radio network which includes a Voice over Internet Protocol (VoIP) application layer and Internet Protocol Stacks including Real Time Protocol, Transport Control Protocol, User Datagram Protocol and Internet Protocol layers, further comprising a compressor/decompressor to compress or remove RTP/UDP/IP headers of voice packets, and means to send voice data and call signalling data separately and in different data formats to the link layer and the air interface of the mobile station, in which voice packets for VoIP applications are sent as a link layer payload directly without going through IP layers.

In one arrangement the compressor/decompressor is arranged between link layer (which is above the physical layer in the air interface) and the IP layer, and receives both the voice data and the call signalling data.

In an alternative arrangement the compressor/decompressor is arranged between the air interface and the VoIP applications layer, and receives the voice data.

Also according to the invention a packet switching radio network comprising a plurality of mobile stations as defined above and at least one network element in which there is compressor/decompressor means arranged to receive signals relating to compressed voice data.

Further the present invention provides a method of operating a packet switching radio network to provide voice services comprising separating the voice data from the call signalling and other data, whereby each voice packet containing voice data is provided with compressed or removed RTP/UDP/IP headers, in which the voice packets for VoIP applications are sent as a link layer payload directly without going through IP layers.

Yet further according to the invention, a first method of compressing and decompressing headers for a packet switching network comprises providing in each compressed header a cyclically-reset timeclick_number representing the sampling time of the packet payload; increasing the timeclick_number by 1 for each sample duration time, counting the reset cycles, and from the count of reset cycles and a received timeclick_number, providing a sequence number and timestamp for providing a decompressed header.

Yet further according to the invention, a second method of compressing and decompressing headers for a packet switching network comprises removing combined RTP/UDP/IP headers and placing data in RLC/MAC payload; and decompressing received packets by use of an internal clock to obtain a timestamp value, and increasing the sequence number by 1 for consecutive packets.

4. BRIEF DESCRIPTION OF THE DRAWINGS

The invention will now be described by way of example with reference to the accompanying drawings in which:

FIG. 6 shows inter-compression point handover.

5. DESCRIPTION OF THE PREFERRED EMBODIMENT OF A MOBILE STATION AND NETWORK

Figure 1:
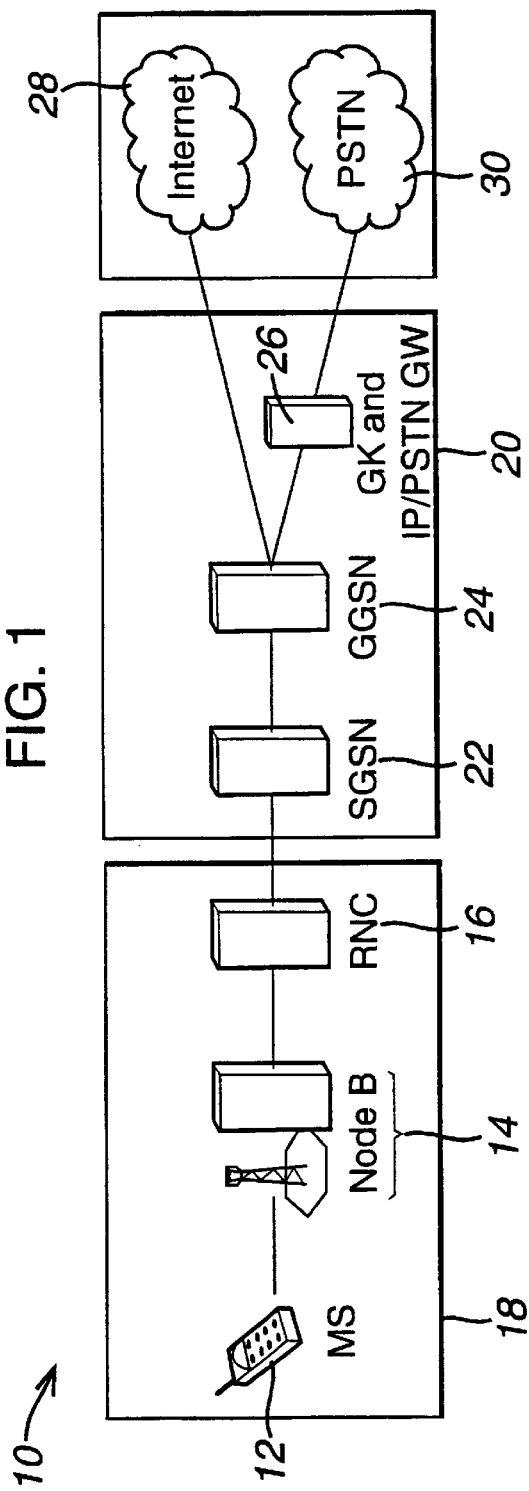
FIG. 1 illustrates a wireless packet switching network based on the UMTS model.

In FIG. 1, a wireless mobile telecommunication system 10 comprises a number of Mobile Stations (MS) 12 and a number of base transceiver stations (Node B) 14 connected through a RNC (Radio Network Controller) 16 (all in the Radio Access Network RAN 18) to a packet Core Network (QN) 20 which consists of two elements: a SGSN (Serving GPRS Support Node) 22 and a GGSN (Gateway GPRS Support Node) 24. The CN is connected via a IP/PSTN Gateway 26, to the PSTN (Public Switched Telephone Network) 30 and to the Internet 28.

In this Figure the network architecture is based on the UMTS reference model.

Suppose the network 10 operates in packet switch mode. One way to implement voice service is to use VoIP technology in which VoIP application from the mobile station 12 is treated as a general IP application and coded voice is decomposed into RTP/UDP/IP packets and transmitted over the air, the RAN 18 and the CN 20 to Internet 28 or the PSTN 30 via the IP/PSTN gateway 26.

At a mobile station 12. IP-based call signalling and the Graphical User Interface of VoIP application can run in the same way as on a normal IP terminal.

The voice traffic is sent as a link layer payload with compressed or removed RTP/UDP/IP header information, as will be explained in more detail below.

Figure 2B:
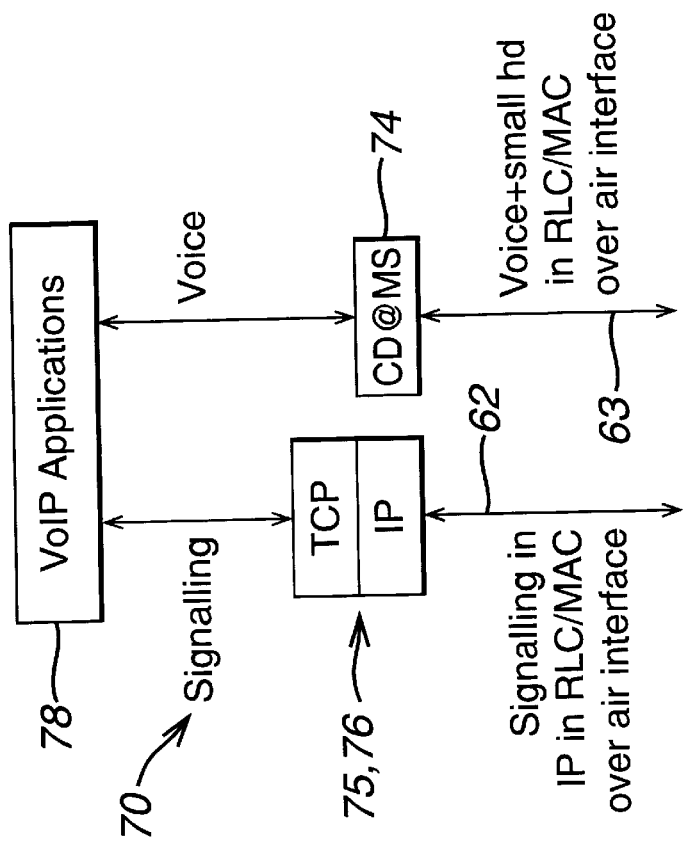
FIGS. 2a and 2b shows two embodiments of the invention in a mobile transceiver.
Figure 2A:
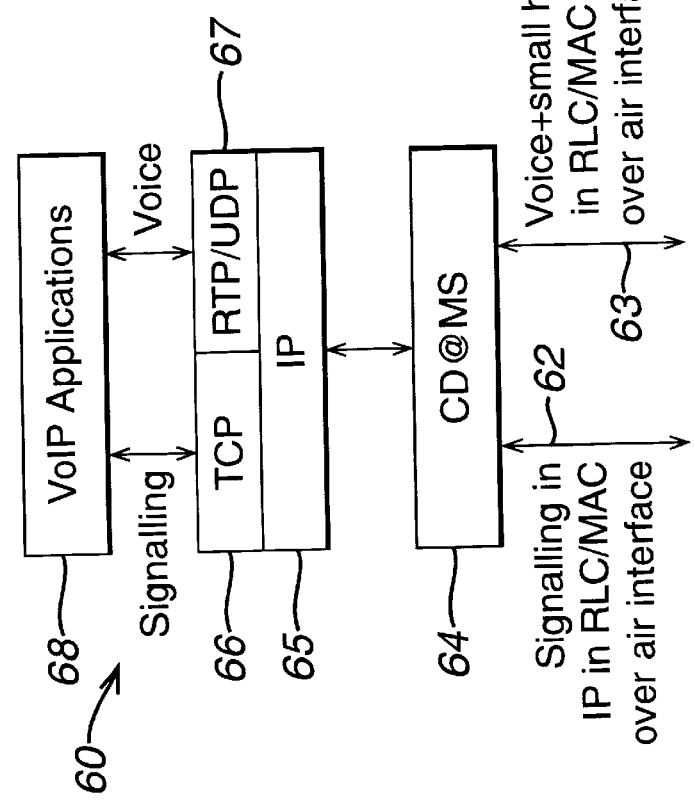

Referring to FIG. 2a, the up-link direction is considered from a mobile station 60 to the network. In the mobile station there is a VoIP application layer 68 from which call signalling data is sent to a TCP layer 66 and an IP layer 65. Voice data is transmitted to an RTP/UDP layer 67 and the IP layer 65.

Both call signalling data and voice data in packets are provided to a compressor 64, which compresses the combined RTP/UDP/IP headers, but the compressor does not compress the call signalling data. The two types of packet 62,63, (compressed and uncompressed) are put in RLC/MAC protocol, and pass over the air interface 61.

To receive voice and call signalling data (the downlink direction) the process is reversed.

In the alternative arrangement for a mobile 70 shown in FIG. 2b, the compressor 74 sends/receives the voice data 63 to/from VoIP application 78 while call signalling data 62 passes through normal IP layers 75, 76.

It can be seen that in both arrangements the voice and call signalling data are separated.

Figure 3:
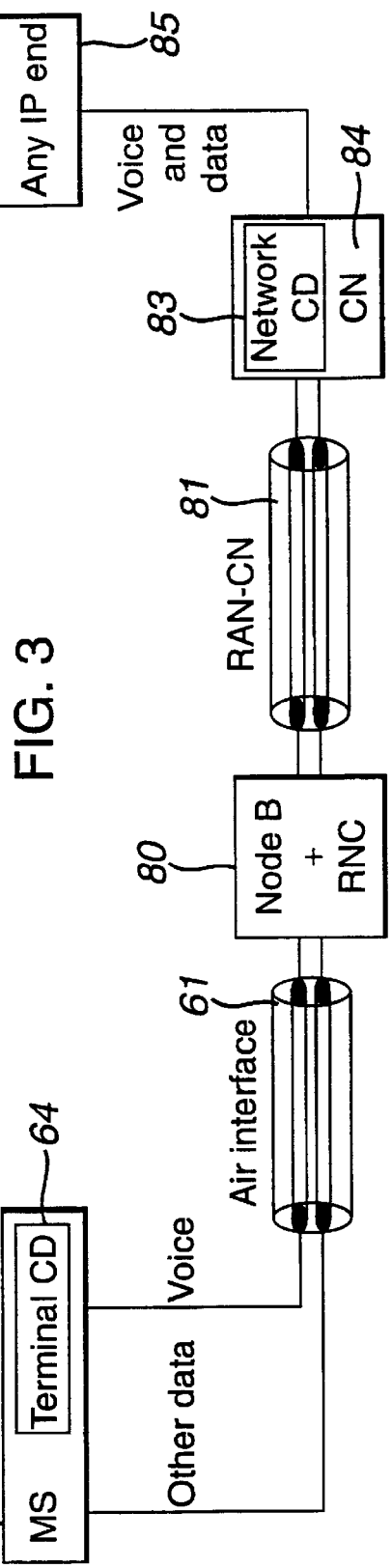
FIG. 3 illustrates an entire communication channel.

FIG. 3 illustrates a whole system, in which a mobile 60 with its compressor 64 is connected through the air interface 61 sequentially to a Radio Access Network (RAN) 81 which tunnels or relays data between the air interface 61 and the Core Network 84, and a decompressor CD 83 in CN 82 connected to any IP host 85 via the Internet.

In the arrangements shown in FIGS. 2a, 2b and 3, it is assumed that the IP/UDP/RTP header information is not used for routing etc, from the mobile station 60 to the CD 83 in CN 84; instead all data including voice packets are relayed/tunnelled. It is assumed that the packets are delivered in sequence between the mobile 60 and the CD 83. It is further assumed that some mechanism will be able to distinguish compressed (speech) packets from normal (uncompressed) packets, and this distinction can be maintained until CN 84 is reached.

The arrangement described may achieve a level of radio efficiency which is of a similar level to a circuit switched voice service provided by wireless telecommunications systems such as GSM.

It is a further advantage that no error recovery mechanism is needed, and there is no inter-packet dependency for decompression, so packet loss does not cause malfunction of the compression point.

The VoIP applications 68, 78 run as if they are accessing a normal IP network although the voice packets are treated differently along part of their journey—from the MS 60 to CN 84. Also, from the viewpoint of the other IP endpoint 85 (a user terminal or a IP/PSTN gateway), the elements in the RAN 81 (MS 60. Node B and RNC 80) are treated as a set as a endpoint, because the voice frames (data 63) need to travel a relatively long way before being RTP-framed at CD 83.

General benefits of the arrangement are that there is higher compression gain and saving of resources; that the system operates when the round-trip-time between compression and decompression is long; and that the benefits from IP-based call signalling can be kept.

6. DESCRIPTION OF THE PREFERRED EMBODIMENTS

There are two compression algorithms for IP/UDP/RTP headers, one can be characterized as a "best-effort lossy compression" and another one can be characterized as "Zero header compression". Both algorithms are based on the fact that the IP/UDP/RTP headers are not used between MS 64 and CN 84.

6a. First Preferred Algorithm

The objective is to break up the interdependency of the compressed packets. Instead of sending relative values in the compressed headers (by differential coding), absolute values (timeclick numbers) are sent as suggested by Petrack. As there is no inter-relationship between compressed RTP packets, packet loss will not stop decompression from operating.

Using the first algorithm the compressed header can be only 1 byte, in comparison with 2 to 5 bytes in a known arrangement. The most important information in RTP header, the two time related fields—timestamp and sequence number, need to be retained. As pointed out in the paper by Petrack referred to above, these two fields can be replaced by a "timeclick number" (in one byte). This number assists the decompressor to put a proper timestamp (reflecting the sampling time at the mobile station 60) and sequence number. The publication suggests that instead of the conventional timestamp and RTP number, a single 1 byte "timeclick" number is sent with each packet. However, in the prior publication there was no disclosure of how to recover the timestamp and sequence number or how to establish compression states out of band.

It is assumed that there is only one VoIP session requiring compression per terminal, thus no CID (Context ID) bits is required. The M bit in RTP header is kept and transmitted with each compressed packet.

Compression-state, first algorithm. The compression state contains the following information for a call (consisting of two RTP sessions) to be compressed: for each call-end: IP address, two port numbers (sourcing and incoming), SSRC etc. for the call: the codec used and its parameter (e.g. sampling rate and sample duration). The codec for both directions is assumed to be the same. (If not then need to store them separately).

The establishment of the compression-state is via an out-of-band protocol, which can work together with the call signalling protocol, and will be described later. This protocol will also help to migrate the state information from one CD to another one in the case of handover between CDs.

Compression process, first algorithm. Through the compression, three fields will be preserved in a nearly lossless way: timestamp, sequence number and the M bit. A byte (8 bits) is used for the compressed header: the first bit is used for the M bit, and the other 7 bits for timeclick_number, which represents the sampling time of the voice payload contained in the packet. It is increased by 1 every sample duration time, e.g. 20 ms for GSM6.10 coding. It will continue to be increased even in the silent period when no packets are actually sent out.

The fields whose information may become inaccurate through the compression are:

The packet ID in IP v4. It is assumed that the packet ID field always increases by 1 so it does not need to be communicated. When packet loss is detected the ID value is set accordingly. As not all packet-loss can be detected so the ID value may become inaccurate.

UDP checksum field. The checksum field is not used (set to 0) from mobile terminal 60. If it is used on the down-link direction, it is set to 0 by the CD in the network (and then the end-to-end error detection for applications that require it is disabled). Thus the error correction using the UDP checksum will be disabled.

RTP CSRC list. For the uplink direction, the CSRC list should always be empty. For the downlink direction, it may change (e.g. in the case of conference call). For 2-party call, it will be unchanged (empty).

Sequence number. In the case of packet loss between the mobile station and the RTP proxy, and the decompressor failed to detect it, the sequence number recovered by the RTP proxy is incorrect, which may influence the accuracy of the statistical result of packet loss rate.

There are two modes of accessing the compression service. One is accessed by the VoIP application directly (as shown in FIG. 2b), by-passing the transport and network layers. The obvious benefit is the efficiency, but it may need some change of the application or need a transport layer wrap up. The service access primitive for the compressor can be:

compress (M, timeclick_number, voicepayload)

It is straightforward to generate a compressed RTP packet with these three data items.

Alternatively the compression service can be accessed by the network layer in a transparent way (as shown in FIG. 2(a)), thus all upper layers are unknown about the compression. In this case, upon receiving a packet from upper layer, it checks the fields of source/destination IP and port number also the source SSRC. These five fields will identify a RTP session and by checking these field against the compression-state table, it is decide either to compress the packet (if it is a RTP packet whose compression state already established), or treat it like non-RTP, normal packet. If it is a RTP packet to be compressed, the timestamp field is mapped to a timeclick-number. Then the above service primitive can be called.

For the downlink direction, if the UDP checksum is used (non-zero), it will be ignored.

After a compressed RTP packet is generated, it is put in a link layer packet together with a marker telling it is a speech packet. Other non-compressed packet will be put into a link layer packet marking itself as general data packet.

Decompression process, the first algorithm.

Except for the time-related RTP header fields, recovery of the other fields are from the compression state using a similar approach to RFC 2508.

For the timestamp field: the major problem to solve is that the field for timeclick number is only 7 bits. The click counting will continue and can easily wrap around (reset periodically) during a single telephone call). During a silent period, if there is no packet sent by the compressor, the time elapsed for this silent period (in terms of how many cycles passed), must be detected.

In the first algorithm according to the invention, a computer clock at the CD 84 is used to count the cycles and the timeclick number is used, with reference to the clock reading, to set the timestamp field. The clock can run at a coarser granularity. For example it can be increased by 1 for every T/4 period assuming the maximum jitter is less than T/4, which is a safe assumption, where T is the time period of a cycle represented by 7 bits. It is usually several seconds, depending on the codec parameters.

Turning now to the sequence number, this number is normally increased by 1 for each consecutive packet. It is mainly used to reflect the packet loss. In the first algorithim according to the invention, a heuristic method is used to detect packet loss by checking both the increases of timeclick number and the M bit. If the timeclick number is increased by a small number other than one (say two, three etc.) but the M bit is not set, then there is likely some packet-loss. In this case the sequence number is increased by the difference of the timeclick number. In the case of the packet that carries the set M bit gets lost (then the bigger increase of timeclick number is normal, as it is silent period), the sequence number should still be increased by 1. The probability for this situation to happen is quite small. Even if this happens and the sequence number is increased by mistake, it will slightly influence the statistic result of packet-loss rate perceived by the other RTP end (a few more packets are reported to be lost).

Denotation:

sd: sample duration, the value should come from the call setup procedure, e.g. 20 ms (voice in each packet)

sr: sample rate, the value should come from the call setup procedure, e.g. 8000 nb: number of bits used for the timeclick number

TSlast: Timestamp number for the previous packet

TSthis: Timestamp number for this packet

WTlast: Wallclock reading for the previous packet

WTthis: Wialclock reading for this packet

TNlast: Timeclick number of previous packet in compressed header

TNthis: Timeclick number of this packet in compressed header

SNlast: RTP sequence number of previous packet

SNthisL: RTP sequence number of this packet

T: the time period represented using nb bits (a cycle period), in units of sample duration (sd) $T=2^{**}nb$ M: the value of the "M" bit, in compressed header Calculating the timestamp and sequence number:

TSthis=Tslast+1, if M=0 and delta_tick=1

=Tslast+(delta_cycle$*(2^{**}nb)$+delta_tick)$*$sd$*$sr/ 1000, otherwise where:

delta_tick=(T+Tnthis−Tnlast) mod T p1 delta_wtick= Wtthis-Wtlast mod T delta_cycle=(Wtthis-Wtlast)/T/*integer part*/ delta_cycle=delta cycle'−1, if delta wtick<delta tick and delta tick-delta wtick>=T/2

=delta_cycle'+1, if delta wtick<delta tick and delta tick-delta wtick>=T/2

=delta_cycle', otherwise

Snthis=Snlast+delta_tick, if delta_tick!=1 and delta_tick<4 and M!=1

6b. Second Preferred Algorithm

The second algorithm for header compression is now described, the header may be zero.

In some cases, for example, GPRS (General Packet Radio System, an overlay packet network over GSM system), the radio bearer channel is designed in such a way that it is hard to put any extra header information together with speech data. Thus we would like to investigate if it is possible to transmit voice in "raw" format (speech only), but still keep most of the benefits from IP telephony (e.g. IP based call signalling thus enable CPL, web-based call etc).

Figure 4A:
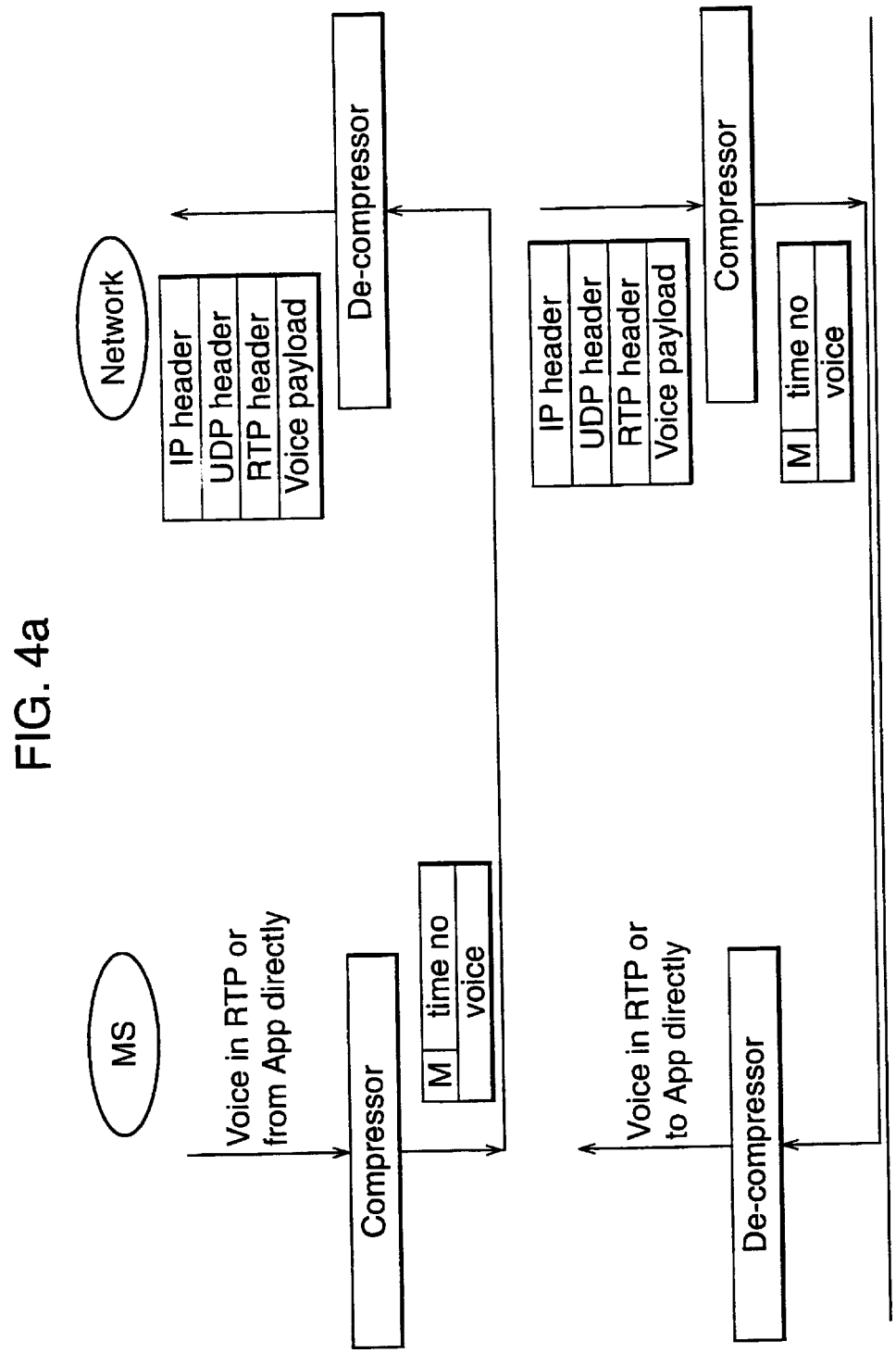
FIGS. 4a and 4b illustrate alternative compression algorithms.
Figure 4B:
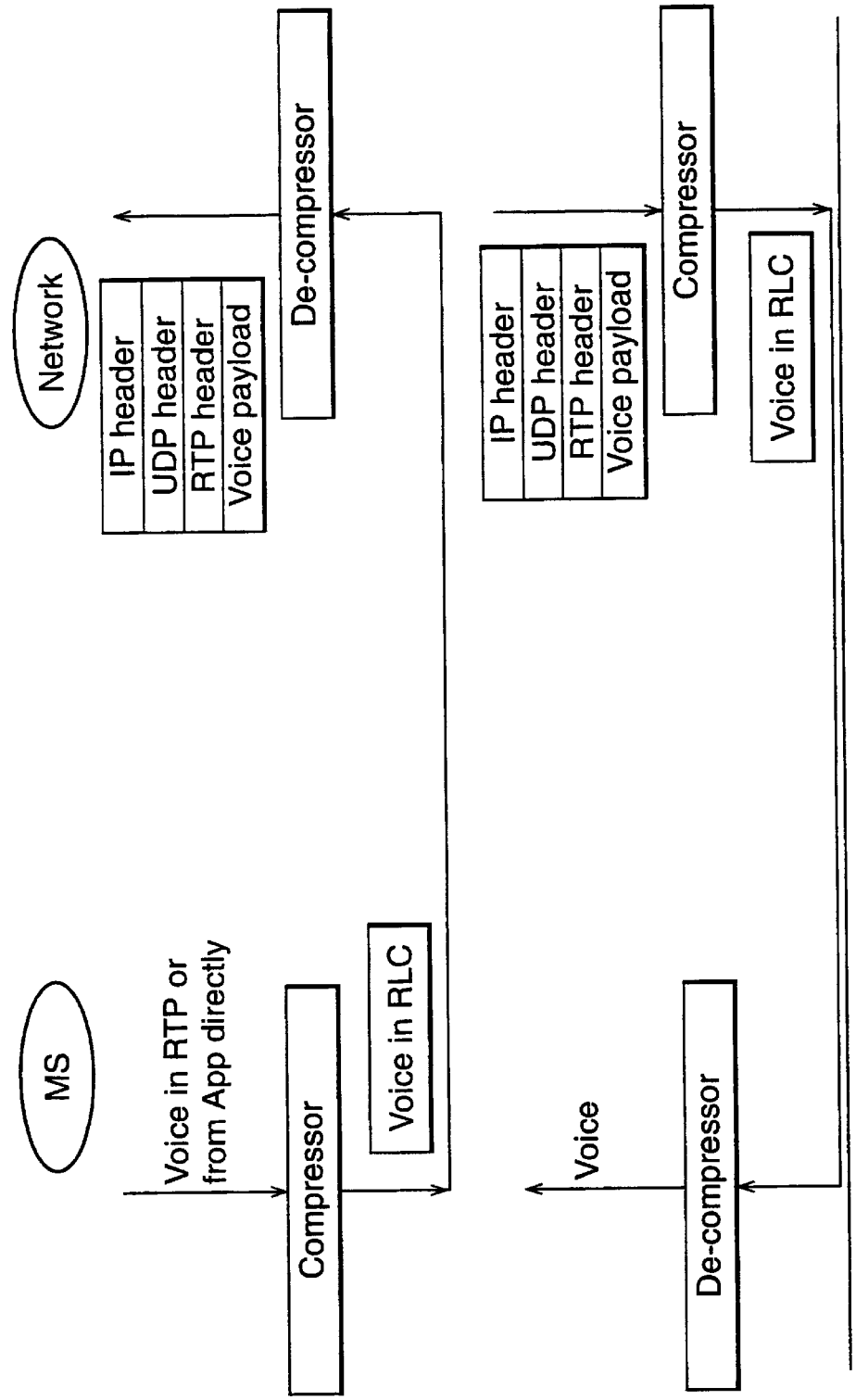

The basic idea of this solution, as shown in FIG. 4b, is that considering that the path between mobile station 60 and CN 84 is over a controlled packet network (over frame relay or ATM, for example) and certain QoS will be provided (no mis-ordering, the jitter and packet-loss-rate are small so that the voice quality will not suffer on this path), it is possible completely to remove the IP/UDP/RTP headers between mobile station and CP and use a box called RTP agent as the decompressor in CN.

In this case the RTP agent (up line direction) performs a role similar to the IP/PSTN gateway: for the up link direction, the voice frames from a mobile station are transmitted without any IP/UDP/RTP headers, in a way very close to the circuit-mode voice in wireless networks, e.g. in GSM. (but is over a "good" quality packet network), up to the RTP agent which adds proper headers and sends them off to VoIP networks. On the downlink direction, the RTP agent strip off the headers and transmit them up to the mobile station.

Using the second algorithm, the benefit of IP based call signalling and service creation is retained. At the same time there is the benefit of high radio resource efficiency. On the other hand, the mobile terminal may lose some capability relying on RTP header information; for example to find the packet-loss-rate and packet delay, and the play buffer may be adjusted accordingly.

The major differences between the first and second algorithms are that, when using the second algorithm:

On the mobile station, the VoIP application loses the chance of using any time-related information in RTP header. For example to detect the packet-loss and calculate the jitter. Note that the compression itself will not introduce extra packet-loss and jitter. It would be difficult to generate proper RTCP packets but can ask RTP agent to do this job on its behalf.

From the viewpoint of the other IP endpoint of the call (a user terminal or gateway), the packet loss detected by the RTP agent (and reflected in the fields of sequence number and timestamp) may be less accurate than the first algorithm.

The way that the CD in the second algorithm adds on (up link) and strips off (down link) IP/UDP/RTP headers is similar to that used in a general IP/PSTN media gateway. The differences are:

The general media gateway normally has two network interfaces: one for PSTN and another one for packet network (e.g. IP, ATM). It translates media between circuit-mode and packet-mode. RTP-agent has two network interfaces both of which are for packet network.

In general media gateway, the voice coming from the PSTN side is continuous and its rate is constant. In our case, as voice frames are transmitted over packet network on both sides, it needs to do more; to try to detect the packet loss in order to put on correct sequence numbers and timestamps by examining the inter-arrival time of the packets from RAN side: it may need to send RTCP packets on behalf of the mobile terminal.

Compression-state, second algorithm. This is the same as in the RTP-proxy approach.

Compression process, second algorithm. The compression process is very simple: it just strips off any header and puts the speech data only into RLC/MAC messages. The service access primitive for the compressor can be:

compress (voicepayload)

Like in RTP-proxy approach, the compression service, at the terminal, can be accessed by the network layer in a transparent way. In this case, upon receiving a packet from the network layer, it checks the fields of source/dest IP and pot number, also the source SSRC. These five fields will identify a RTP session and by checking these fields against the compression-state table, it is decided either to compress the packet (if it is a RTP packet whose compression state already established), or treat it like non-RTP, normal packet. If it is a RTP packet to be compressed, the headers are strip off and the above service primitive can be called.

For the downlink direction, the CD in the network checks each packet to see if it belongs to a RTP session being compressed. If yes the RTP/UDP/IP headers are stripped off and the speech data is put into the payload of, for example, the tunnelling protocol addressed to the right mobile terminal.

Decompression process, second algorithm. At the decompressor in the network (CD 84), a computer clock is used. As for the first algorithm, the major problem is how to recover the time-related fields. There are two ways to do this:

(a)—The decompressor checks at the beginning of every sampling duration period (the period covered by the speech frame(s) carried by an RTP packet; for example it will be 20 ms if each RTP packet carries one GSM6.10 speech frame) to see if there is any compressed speech packet coming from RAN. If "yes" the decompressor adds IP/UDP/RTP headers on the packet. The decompressor maintains a small buffer for incoming speech packets from RAN to smooth out the jitter.

The decompressor obtains the timestamp value from the internal clock (translated to the sampling time format as used in RTP). The sequence number is increased by 1 for each packet.

(b)—Alternatively, the decompressor checks the inter-arrival time of each compressed packet arriving at the RAN side to guess if there is any packet-loss, considering the variation of delay and the possibility of silent period. After this analysis is performed, if the packet just arrived is thought as the consecutive speech packet of the previous one, then timestamp is increased in the same way as at the source (added by a constant value, which is determined by the coding scheme used, on the top of the timestamp value of the previous one). The sequence number is added by one on the top of the sequence number of the previous packet. If a packet loss is inferred then the sequence number and timestamp will be increased accordingly to reflect the gap. If a long gap is detected and a silent period is inferred, the sequence number is added by 1 but the timestamp need to reflect the gap.

While the first and second preferred algorithms have been described with reference to a packet switching radio network, both algorithms may also be applied in other circumstances where the following features hold:

- The first leg between a mobile station and IP network is a point-to-point like connection over which the IP headers are not used.
- The first leg of connection guarantee in-order delivery and small jitter. Some header inaccuracy pointed out before is acceptable for the application.

7a. A preferred process of compress-state establishment and re-establishment

The compression-state establishment process is used for several purposes/occasions:

- At the beginning of a RTP session, the compression-state needs to be established to start compression and decompression.
- When inter CDs handover happens, the compression-state needs to be migrated to the new CD from mobile terminal and/or from the old CD.

The compression-state contains the following information: IP address and SSRC for both call ends, two pairs of RTP (UDP) port numbers, payload type, sampling rate, sample duration, etc.

It is assumed that the voice coding for both directions are the same, otherwise they need to be stored separately.

Figure 5:
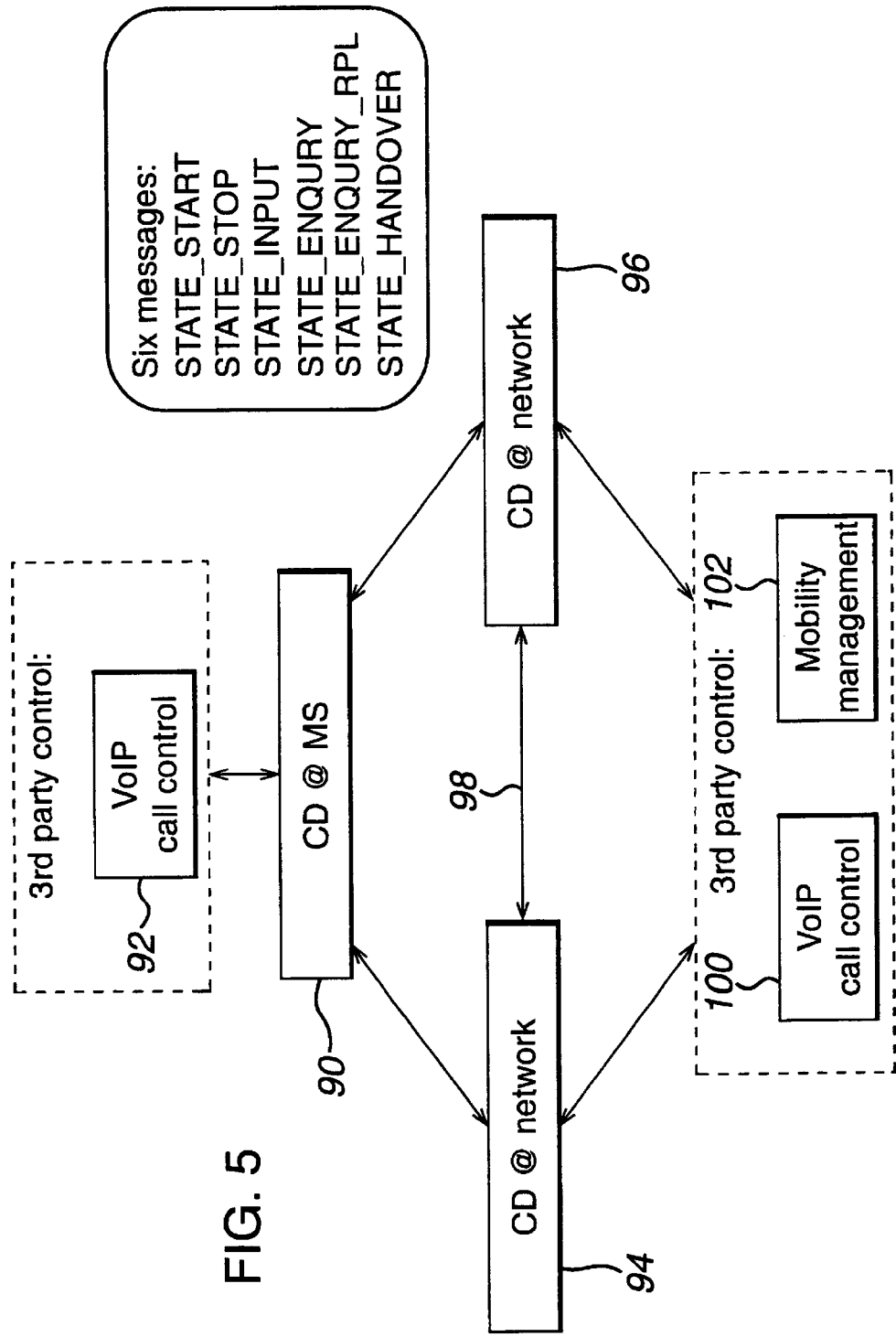
FIG. 5 shows establishment or re-establishment of compression state.

The compression state establishment and re-establishment are done using an out-of band protocol, which is shown in FIG. 5 which shows a mobile station compressor 90 connected to a VoIP call control layer 92 under third party control; a serving network CD 94 and another network compressor 96; and the network CDs 94, 96 are connected directly by an out-of-band link 98, and are also connected to a VoIP call control layer 100 and a mobility management layer 102 under third party control.

All the CDs 90, 94, 96 are in reality compressor/decompressors.

The CDs 90 at the mobile station and 94 in the network have a control interface. Both CDs listen on a known port to accept instructions to start/stop compression and receive state information from the third party. Typically the instruction and information come from the voice application at MS and/or signalling gateway (e.g. a 4.323 Gatekeeper or SIP (Session Initiation Protocol) server) inside network. (Assume that the IP address of the serving CD is known to the signalling gateway.)

There are six messages defined between CD and a third party control or between two CDs (not including the acknowledgement messages):

1. STATE_START. This message indicates that a new compression session and its state is to be established. It should contain an identity of the MS being involved in the session. As an option it can contain a full (uncompressed) RTP packet so that the compression state information can be extracted from it.
2. STATE_INPUT. This message provides or modifies values of state attributes. It contains a list of (attribute_name, value) pair.
3. STATE_ENQRY and STATE_ENQRY_RPL. These two messages can be used to inquiry the state information and to know if it is ready to perform compression/decompression tasks.
4. STATE_HANDOVER. This message informs a current serving CP to send state information to a new CP, or asks a new serving CP to acquire state information from a previous serving CP. The message contains information bout the IP address of old and new CPs and the identity of the MS involved.
5. STATE_STOP. This message deletes a compression state. A compression can also be deleted by compressor itself when necessary.

The message STATE_INPUT is also used between the compressor 90 at MS and the CD 94, 96 in network to exchange state information. So the information available at one end will be available at the other end by using this protocol.

The messages STATE_INPUT and STATE_ENQRY are also used for moving state information from one CD to another in the case of handover. Apart from the state elements listed above, some extra information such as local clock reading is also exchanged to the new CD.

It is allowed for the compressor to pick up values or use default values for some attributes in some circumstances.

This process also supports the state re-establishment between CDs at MS and in network. This is necessary when the state information is damaged or lost at one side. Once the compressor at CD or MS detects the miss or incompleteness of state information, it can use STATE_ENQRY to obtain the state information from the other end.

While the inventive process of establishing or re-establishing compression state has been described with reference to a packet switching radio telecommunications network, the process may also be used for any compression process for a connection oriented application such as VoIP and multimedia sessions.

8. Two preferred processes for handover between two compression-points

One problem to use the compression scheme presented in RFC2508 within wireless networks is the impact of mobility. When a handover occurs, it is possible that the serving CD will change. So the compression states stored in the CD before handover have to be moved to or re-established at the new CD.

Two alternative approaches are proposed to cope with this problem:

Firstly, we can arrange some communication between two CDs so that they can exchange compression states, as shown in FIG. 6 in which a mobile station having a compressor 104 is handed over from a serving CD in network 106 to a new CD 108 in network. The serving and new CDs 106, 108 are provided with an out-of-band communication channel 110.

One way is to share the compression state information among a group of CDs (which may potentially become the serving CD after handover), so that when handover happens the necessary compression context already ready in the new CD. The cost of this method is the CPU time and memory required to receive/store the context which may not be used at all.

Another way is to exchange the contact information during handover. To apply this approach, we need the co-operation from the handover mechanism so that the exchange of compression states information can be triggered when the CD is changed.

A third way is to make use of soft-handover feature available in CDMA networks. The exchange of context can be performed during soft-handover period. This approach requires the co-operation from the radio network so that the two CDs can be informed when a soft-handover happens.

To allow the decompression process at the new CD, the exchange of compression-state information should include the timestamp value and sequence number value in the last decompressed RTP packet by the previous CD. The two computer clocks at the previous and new CD need not be synchronized. When the new CD start to serve the RTP session handed over, it read its own clock and uses the reading as the clock reading for the last packet.

Secondly, as in UMTS and GPRS situation, the user IP will not be used until the point to leave CN for backbone network(a tunnelling protocol is used to transport user packet between BSS and CN). Therefore we can make use of this feature and put CP at the edge of CN, for example at GGSN so that the CP is transparent to the handover. In particular, by moving the CP into CN, the CP and the IP/PSTN gateway, which is required to make use the VoP service network, can be integrated. The drawback of this approach is the possible performance bottleneck at the CP in network.

Several modifications of the present invention will become readily apparent to those skilled in the art in the light of the foregoing disclosure. Therefore, the scope of the present invention should be interpreted from the following claims, such claims being read in the light of the disclosures.

What is claimed is:

1. A method of operating a packet switching radio network to provide voice services comprising separating voice data from call signalling and other data, whereby each packet containing voice data is provided with compressed or removed RTP/UDP/IP headers, in which each voice packet header comprises a cyclically-reset timeclick_number representing the sampling time of the packet payload; the timeclick_number being increased by 1 for each sample duration time; and in which the headers are decompressed by counting the reset cycles by means of a separate clock; together with the received timeclick_number to provide the sequence number and timestamp of a decompressed header.

2. A method according to claim 1 comprising in a mobile station removing combined RTP/UDP/IP headers and placing voice data in RLC/MAC payload; and decompressing received voice packets by using an internal clock to obtain a timestamp value, and increasing the sequence number by 1 for consecutive packets.

3. A method according to claim 1 comprising, in a mobile station, removing combined RTP/UDP/IP headers and placing voice data in RLC/MAC payload; and decompressing received voice packets by determining packet inter-arrival times to detect loss of any packet, and if such loss is detected, adjusting the timestamp value and sequence numbers of RTP headers of subsequently received voice packets accordingly.

4. A method according to claim 2, in which the compression state of a voice packet header is established by making use of call set-up information over an out-of-band communications protocol between a mobile station and a compression/decompression in the network.

5. A method according to claim 1 further comprising providing an out-of-band communications protocol between a serving compressor/decompressor in the network and other compressor/decompressors in the network, and, on handover of the call, exchanging compression context information relating to a current call between the serving compressor/decompressor and a new serving compressor/decompressor.

6. A method according to claim 5 in which the exchanged compression context information includes the timestamp value of the last decompressed RTP packet.

7. A method according to claim 6 in which the network is a Code Division Multiplexing Access network having a soft-handover facility, and preparing and performing exchange compression context information during a soft-handover period.

8. A method of operating a packet switching radio network to provide voice services comprising separate voice data from call signaling and other data, whereby each packet containing voice data is provided with compressed or removed RTP/UDP/IP headers, in which the voice packets for VoIP applications are sent as a link layer payload directly without going through IP layers, in which each voice packet header comprises a cyclically-reset timeclick_number representing the sampling time of the packet payload; the timeclick_number being increased by 1 for each sample duration time; and in which the headers are decompressed by counting the reset cycles by means of a separate clock; together with the received time_click number to provide the sequence number and timestamp of a decompressed header.

* * * * *